Patented May 31, 1932

1,860,461

UNITED STATES PATENT OFFICE

EMIL HUBERT, OF ELBERFELD, ALEX RÖST-GRANDE, OF DORMAGEN, AND KARL WEISBROD, OF ELBERFELD, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF PREPARING STABLE CELLULOSE ESTER SOLUTIONS

No Drawing. Application filed October 3, 1928, Serial No. 310,177, and in Germany October 10, 1927.

The present invention relates to a process of preparing stable cellulose ester solutions.

It is known that in the process of esterifying cellulose, strong acids, such as sulfuric acid, phosphoric acid and the like are advantageously added as contact substances. These acids must be removed after esterification since otherwise the cellulose ester solutions will deteriorate within a short time.

Now we have found that this removal is advantageously performed by adding to the crude cellulose ester solutions a compound of the group consisting of magnesium oxide, magnesium hydroxide and salts of magnesium with organic or inorganic acids weaker than the acid used as contact substance, in a quantity at least sufficient to react with all of the contact acid present, care being taken that the magnesium salt formed by the neutralizing process separates in as good crystalline form as possible. Especially good results will be obtained by adding a compound of the kind mentioned to a solution of acetyl cellulose in acetic acid, esterification having been performed by means of acetic acid anhydride in the presence of sulfuric acid. In this case it will be possible to separate the magnesium sulfate formed in an excellent crystalline form. For each of the magnesium compounds above mentioned, the amount to be added, the quickness of the addition, the temperature and concentration of the solution in view of the acetyl cellulose content as well as of that of the acetic acid may vary in wide limits, but are advantageously chosen in such a manner, that magnesium sulfate of the probable formula $MgSO_4.7H_2O$ separates in crystals as large as possible. For instance magnesium acetate may be dissolved in acetic acid of 50% strength and this solution is caused to slowly drop into a solution of acetyl cellulose in acetic acid of about 65–75% strength at ordinary temperature while stirring. The magnesium acetate is used in a quantity at least equivalent to the sulfuric acid present, a little excess of the former being often of advantage. Furthermore it will be useful to start with acetyl-cellulose-acetic acid solutions of not too high viscosity, solutions of acetone-soluble acetylcellulose of for instance about 8–12% acetylcellulose content possessing a viscosity suitable for performing our process. After the separation of the crystalline magnesium salt, the solution is freed from it for instance by filtering or centrifugalizing and can then be used without any further purification for the manufacture of filaments, films and the like of high quality. It may be mentioned that filtration performs in a very convenient and quick manner and that the filtered solutions are completely clear and stable and can be kept for a long time without any deterioration.

The following example illustrates our invention without limiting it thereto:—

*Example:*—Magnesium acetate, dissolved in acetic acid of about 50% strength is added in a little excess (calculated upon the sulfuric acid present) to a solution of acetone soluble acetyl cellulose, obtained in the usual manner by esterifying cellulose in a mixture of glacial acetic acid, acetic acid anhydride and sulfuric acid. The addition is performed slowly while stirring and at a normal temperature. After the addition, diluted acetic acid is caused to run in, always while stirring, until a solution containing about 65% of acetic acid and about 8–10% of acetylcellulose is obtained. After some time magnesium sulfate of the probable formula $MgSO_4.7H_2O$ separates in a good crystalline form. After separation has finished, the solution is filtered and can be used for the production of filaments, films and the like of high quality without further purification.

We claim:—

1. In the process of preparing stable cellulose ester solutions, the step which comprises adding to a solution obtained by esterifying cellulose with an organic acid in the presence of a contact acid, a magnesium compound of the group consisting of oxide, hydroxide and salts of acids weaker than the contact acid, in a quantity at least sufficient to react with all of the contact acid present.

2. In the process of preparing stable cellulose ester solutions, the step which comprises adding to a solution obtained by esterifying cellulose in a mixture of glacial acetic acid, acetic acid anhydride and sulfuric acid, a magnesium compound of the group consisting of oxide, hydroxide and salts of acids weaker than sulfuric acid, in a quantity at least sufficient to react with all of the sulfuric acid present.

3. In the process of preparing stable cellulose ester solutions, the step which comprises adding to a solution obtained by esterifying cellulose in a mixture of glacial acetic acid, acetic acid anhydride and sulfuric acid, magnesium acetate in a quantity at least sufficient to react with all of the sulfuric acid present.

4. The process of preparing cellulose ester solutions which comprises mixing at normal temperature a solution obtainable by esterifying cellulose in a mixture of glacial acetic acid, acetic anhydride and sulfuric acid with a solution of magnesium acetate dissolved in acetic acid of about 50% strength containing magnesium acetate in a somewhat greater amount than is necessary to react with the total amount of sulfuric acid present in the esterifying mixture, diluting the mixture with diluted acetic acid so that the mixture finally contains acetic acid of 65–75% strength and 8–10% of acetyl-cellulose, allowing the magnesium sulfate formed to crystallize and separating it from the solution.

In testimony whereof we have hereunto set our hands.

EMIL HUBERT. [L. S.]
ALEX RÖST-GRANDE. [L. S.]
KARL WEISBROD. [L. S.]